United States Patent [19]

Knoll et al.

[11] 4,392,085
[45] Jul. 5, 1983

[54] DIRECT DRIVE BALLAST WITH DELAYED STARTING CIRCUIT

[75] Inventors: William C. Knoll, Turbotville; David L. Bay, Muncy, both of Pa.

[73] Assignee: GTE Products Corporation, Stamford, Conn.

[21] Appl. No.: 218,386

[22] Filed: Dec. 19, 1980

[51] Int. Cl.³ .................... H05B 37/00; H05B 39/00
[52] U.S. Cl. .......................... 315/173; 315/DIG. 5; 315/DIG. 7; 315/160; 315/175; 315/223
[58] Field of Search ................. 315/219, 205, DIG. 7, 315/223, 276, DIG. 5, 160, 172, 173, 175

[56] References Cited

U.S. PATENT DOCUMENTS 4,127,795 11/1978 Knoll .................................. 315/205
4,188,661 2/1980 Bower et al. ...................... 315/205

Primary Examiner—Saxfield Chatmon, Jr.
Attorney, Agent, or Firm—John A. Odozynski

[57] ABSTRACT

A delayed starting circuit for an electronic ballast system that includes an inverter coupled to a secondary voltage source. The starting circuit includes a voltage divider having an input coupled to a charge storage capacitance in the voltage source and an output coupled through a semiconductor switching device to an input of the inverter. The switching device remains non-conductive until the capacitance has been substantially charged, thereby protecting the inverter from transients encountered as a surge of charge is delivered to the capacitance subsequent to the initial energization of the ballast circuit.

16 Claims, 1 Drawing Figure

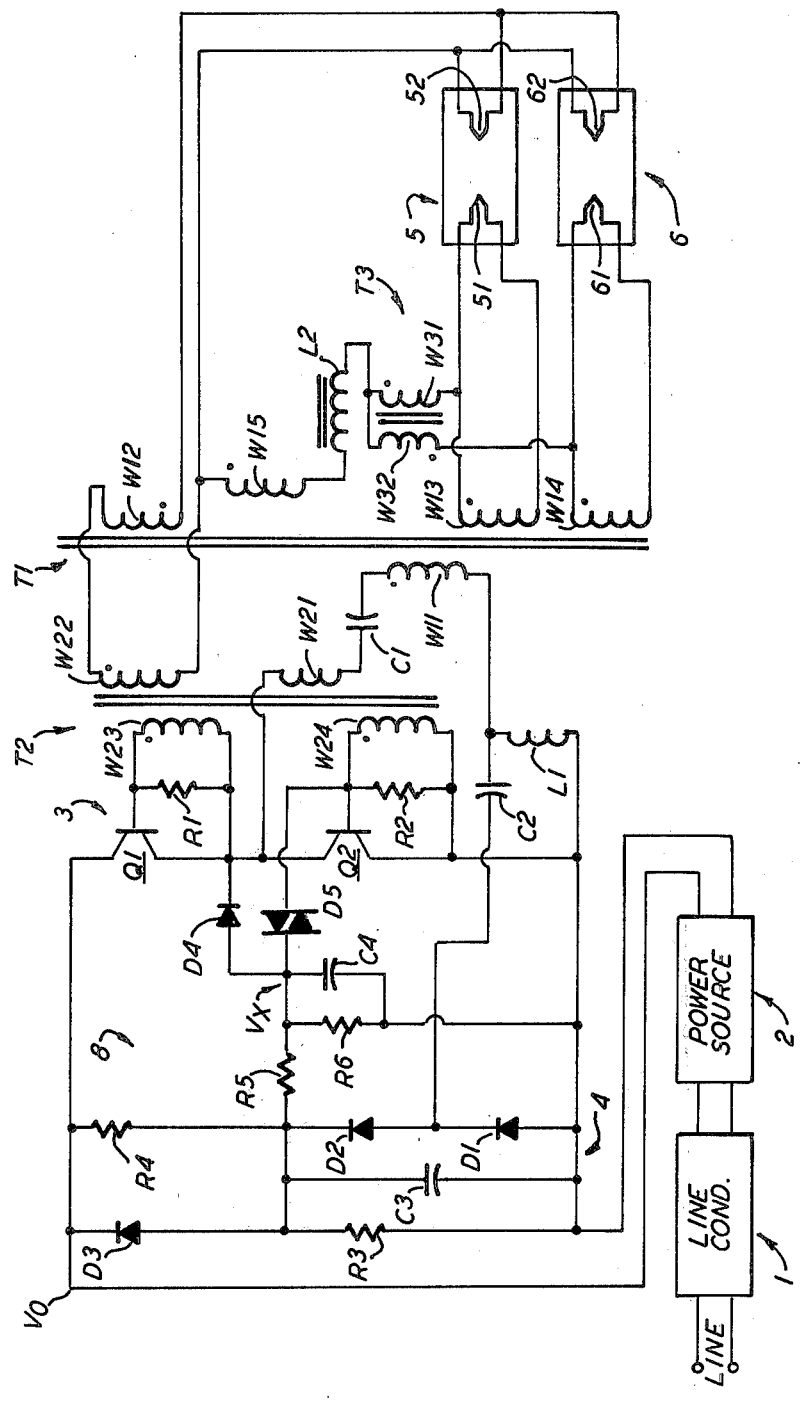

DIRECT DRIVE BALLAST WITH DELAYED STARTING CIRCUIT

CROSS REFERENCE TO RELATED APPLICATIONS

Cross reference is made to the following applications, all assigned to the same assignee and filed on the same date as this application.

"Improved Output Configuration For Electronic Ballast", by William C. Knoll, Appl. Ser. No. 218387;

"Improved Transistor Drive Scheme for Fluorescent Lamp Ballast", by William C. Knoll and David LaRue Bay, Appl. Ser. No. 218388, now and U.S. Pat. No. 4,353,010

"Dimming Circuit For An Electronic Ballast", by William C. Knoll, Appl. Ser. No. 218311, now U.S. Pat. No. 4,353,009.

TECHNICAL FIELD

This invention relates to electronic ballast circuitry and more particularly to a starting circuit that delays operation of a semiconductor inverter until a charge storage capacitor in a secondary voltage source has become substantially charged.

BACKGROUND ART

United States Pat. No. 4,188,661, "Direct Drive Ballast With Starting Circuit", by Bruce L. Bower and Raymond H. Kohler, dated Feb. 12, 1980, assigned to the assignee of the present invention, and hereby incorporated by reference, describes an electronic ballast circuit for driving a pair of fluorescent lamps. Central to the operation of that circuit is a high frequency (20 to 30 KHz) inverter comprising two transistors connected in series and operating in a push-pull mode. The inverter drives, via an output transformer, the cathode filaments of the lamps. The output transformer comprises a series-resonant primary winding coupled to the inverter output. The secondary of the output transformer includes one lamp voltage winding, three filament windings. Two filament windings separately supply current to one filament of each of the lamps. The third filament winding supplies current to the remaining two parallel-connected, filaments. Also included on the secondary of the output transformer is a series connected discrete ballasting inductor and a pair of bias windings oppositely poled and connected in series between the first and second filament windings. These windings are arranged so as to establish a voltage differential across the cathodes of the respective lamps sufficient to effect firing of the lamps.

The ballast circuit further includes an interstage transformer having three primary-wound feedback windings each coupled in a loop that includes at least one lamp filament and a filament winding. The secondary of the interstage transformer includes a pair of oppositely-poled drive windings coupled to the push-pull inputs of the inverter. Because the primary windings are coupled in a loop that includes the lamp filaments, they induce a voltage in the secondary proportional to the sum of filament currents. Proper phasing of the secondary windings provides the positive feedback necessary to sustain inverter operation. (A modified feedback arrangement disclosing a single primary winding connected in a loop with the two-parallel-connected filaments is disclosed in U.S. Pat. No. 4,127,893, "Tuned Oscillator Ballast Circuit With Transient Compensating Means", by Charles A. Goepel and assigned to the assignee of the present invention. See FIG. 2 of that patent).

U.S. Pat. No. 4,188,661 also discloses circuitry for enhancing the oscillator startup operation. Upon initial energization of the ballast circuit, a capacitor connected in parallel with one of the secondaries of the interstage transformer is slowly charged through a source of slowly developed DC voltage. When the charge across the capacitor reaches a given magnitude, a series connected diac is switched on thereby discharging the capacitor through a relatively low impedance and causing a transient across one of the drive windings of the interstage transformer. This perturbation supplies base drive to at least one of the inverter transistors and assures oscillator startup. A voltage derived from the current in the primary of the output transformer is applied to the diac in a manner that renders the diac nonconducting during steady state operation of the ballast circuit.

While it cannot be said that the circuitry disclosed in the patent discussed above represents a substantial advance in the state of the art of ballast design, with regard to both the conventional electromagnetic and the electronic types, the subject invention represents a further substantial advance in that art. In particular the improved output transformer configuration disclosed herein provides, inter alia, improved power efficiency and rapid firing of a dual lamp system.

DISCLOSURE OF THE INVENTION

The above and other objects and advantages are achieved in one aspect of this invention by a delayed starting circuit for an electronic ballast that includes an inverter for driving fluorescent lamps. The starting circuit includes a voltage divider having an input coupled to a capacitance in a secondary voltage source and an output coupled through a semiconductor switching device to an input of the inverter.

The switching device remains nonconductive until the capacitance has become substantially charged so that the inverter is protected from transients encountered as the ballast circuit is initially energized and a surge of charge is supplied to the capacitance.

BRIEF DESCRIPTION OF THE DRAWING

The sole drawing is a schematic diagram of an electronic ballast circuit employing the subject invention.

DESCRIPTION OF THE PREFERRED EMBODIMENT

For a better understanding of the present invention, together with the objects, advantages and capabilities thereof, refer to the following disclosure and appended claims in conjunction with the accompanying drawing.

Referring now to the drawing, the electronic ballast circuit derives its primary power from the AC lines through a line conditioner 1. The line conditioner may include, inter alia, a transient suppressor, overload switch and line filter. See, e.g. U.S. Pat. No. 4,188,661, supra, at column 2, lines 38–48, column 3, lines 36–52, and as illustrated in the drawing as element 5. The output of the line conditioner is coupled to the input of a voltage supply 2 ($V_o$) which provides a nominal output voltage of 300 volts.

The core of the electronic ballast system illustrated in the drawing is the high frequency, push-pull inverter 3 comprising NPN transistors Q1 and Q2. Q1 has a collector connected to the high side of the voltage supply and an emitter connected to the collector of Q2; the emitter of Q2 is in turn connected to the common or ground return of the voltage supply. The base-to-emitter junctions of both Q1 and Q2 are individually coupled by damping resistors, R1 and R2, respectively. The output of inverter 3, that is, the signal at the junction of Q1 emitter and Q2 collector, is coupled through a capacitor C1 to one end of the primary winding, W11, of output transformer T1. A detailed discussion of the construction and operation of T1 is presented below. In a preferred embodiment the output of the inverter is coupled to W11 through a network that includes the series connection of C1 and a phase-feedback winding, W21, on the primary of an interstage transformer T2. The other end of W11 is coupled to the input of what, for present purposes, will be considered a secondary voltage source 4.

Voltage source 4 includes an inductance L1 connected between W11 and the common return. The junction of W11 and L1 is coupled through capacitor C2 to a voltage-doubling peak rectifier that includes diodes D1 and D2, charge storage capacitor C3, and resistor R3. D1 has a cathode connected to C2 and an anode of D2 connected to the cathode of D1 and a cathode of D2 connected to one side of C3; the other side of C3 is connected to the common return. R3 is connected in parallel with C3. The output of the secondary voltage source 4 is coupled through a diode D3, in the anode-to-cathode direction, to the high side of the primary voltage source 2.

Operation of voltage supply 4 is contingent on the operation of the inverter circuit in the following manner. When operating the inverter develops approximately a 20 KHz square wave at the junction of Q1 and Q2. (The frequency of the output signal is largely determined by the resonant frequency of C1 and W11, the effect of W21 being substantially negligible). The current flowing in W11 is coupled to the common return through L1, thereby developing a periodic voltage across L1 in proportion to that current. That voltage is coupled through C2 to rectifying diodes D1 and D2. In standard fashion the charge stored in C3 will represent a voltage substantially equal to the peak-to-peak voltage across L1, less losses attributable to the rectification process. Normally the voltage developed by the secondary source 4 will be less than that developed by the primary source 2 so that D3 will be reverse biased, the two sources isolated from each other, and negligible current drawn from the secondary source. However, under low-line or other aberrant conditions, the voltage at the output $V_o$ may drop so significantly that D3 will become forward biased and the secondary source will then be available to power the inverter circuitry.

Startup of the oscillator is assured by a startup circuit 5 that includes a charging resistor R4, voltage divider resistor R5 and R6, a clamping circuit, including clamping diode D4 and clamping capacitor C4, and a semiconductor switch in the form of diac D5.

R4 is coupled from the high side of $V_o$ to one side of C3 so that, subsequent to the energization of the ballast circuit, C3 begins to charge toward the voltage at the output of that source. (To be precise, it will take some time for output of $V_o$ to attain its nominal value but this duration can be expected to be de minimis in comparison with the R4C3 time constant). R5 and R6 are series connected across C3, so that the voltage developed at the junction of R5 and R6, ultimately coupled to D5, will track the exponentially-rising voltage across C3. As illustrated in the drawing D5 has one end coupled to the output of the voltage divider, at the junction of R5 and R6, and the other end coupled to an input of the inverter, at the base of Q2. Neglecting the effect of R3, the voltage, $V_x$, at the output of the voltage divider will increase roughly as $$\frac{R6}{R5+R6} = V_o(1 - e - t/R4\,C3).$$

At some time determined by the values of the components represented in that relationship above, $V_x$ will exceed the breakover voltage of D5. D5 will fire, thereby supplying bias current to the base of Q2 and initiating operation of the inverter, after which the inverter will become self-sustaining. The salient advantage of this startup circuit is that startup of the inverter is inhibited until C3 of the secondary voltage source has become charged. As a result the inverter transistors are spared some deleterious effects attendent the initial current surge required to charge C3.

The startup circuit also includes a clamping circuit comprising D4, with a cathode connected to the inverter output and an anode connected to the voltage divider output, and C4, connected from there to ground. The clamping action of D4 and C4 prevents the inverter square wave output from randomly firing D5. In effect, the clamping circuit disables the starting circuit during steady state inverter operation so that Q1 and Q2 are not subjected to transients that might result from the random firing of D5.

As illustrated in the drawing, the output of the inverter is coupled to T1 and drives a pair of fluoresent lamps, 5 and 6, having filaments 51 and 52 and 61 and 62, respectively. Filament current is supplied by secondary-wound filament windings W12, W13 and W14 on the secondary of the output transformers T1. Each of the filament windings is arranged to form a circuit loop with at least one filament of a lamp. W13 forms a loop with filament 51, W14 with filament 61, and W12 with the parallel-connected filaments 52 and 62. A bias winding, W15, on the secondary of T1 has a first end coupled to filaments 52 and 62, and a second end coupled to filaments 51 and 61. The bias winding establishes the necessary voltage differential across the filaments of lamps 5 and 6.

As illustrated in the drawing the bias winding W15 is coupled to filament windings 51 and 52 through an inductance L2 and a differential transformer T3. One end of L2 is connected to the second end of W15 and the other end is connected to a common terminal of T3. T3 includes first and second oppositely-poled windings, W31 and W32. W31 and W32 each have one end coupled to the common terminal of T3 and the other ends respectively coupled to filaments 51 and 61. T3 comprises approximately 100 turns of #28 wire wound on a 3/16-inch "double-E" core, Ferroxcube type 813.

T3 operates to enhance the firing of cold lamps. Assuming that one of the lamps fires initially, there will be a sudden increase in current through either winding W31 or winding W32, depending on whether lamp 5 or lamp 6 has fired. Assuming lamp 5 has fired the current surge in winding W31 will induce a voltage in winding W32. Because W31 and W32 are oppositely poled, the voltage induced in W32 will add to the voltage developed by bias winding W15, thereby assuring that lamp 6 will fire soon after lamp 5. Of course, the opposite would be true should lamp 6 fire before lamp 5.

L2, coupled between W15 and T3, is included to provide the proper series reactance for lamp ballasting. L2 comprises approximately 75 turns, 15—#36 Litz wire wound on a Ferroxcube core as specified above.

The necessary feedback to sustain inverter oscillation is provided by interstage transformer T2. T2 includes a primary-wound feedback winding W22 and oppositely poled secondary-wound drive windings W23 and W24. As shown in the drawing W22 is part of a circuit loop that includes filament winding W12 and parallel-connected filaments 52 and 62. Therefore, the current that flows through those filaments must necessarily flow through W22 as well. This signal is fed back to W23, coupled across the base-to-emitter junction of Q1, and W24, coupled across the base-to-emitter junction of Q2, in phase opposition (by virtue of polarity of those windings) so as to effect push-pull operation of the inverter.

As alluded to above, T2 also includes a winding W21 in series with W11 in order to allow some relaxation of the switching parameter requirements of transistors Q1 and Q2. In particular, the switching speeds of transistor Q1 and Q2 need not be as closely matched as would be required in the absence of W21, and, therefore, less expensive transistors will be sufficient. This is because a small amount of the C1-W11 loop current is fed back to Q1 and Q2 as a function of the inverter operating frequency, thereby compensating for variations in the switching speeds of Q1 and Q2.

Accordingly, while there has been shown and described what at present is considered to be the preferred embodiment of an improved output configuration for an electronic ballast circuit, it will be obvious to those skilled in the art that various changes and modifications may be made therein without departing from the invention as defined by the appended claims.

INDUSTRIAL APPLICABILITY

This invention is useful in electronic ballast systems for fluorescent or other types of lamps.

What is claimed is:

1. A delayed starting circuit for an electronic ballast system that includes an inverter for driving a fluorescent lamp, a primary voltage source, and a secondary voltage source derived from the inverter output signal, said starting circuit comprising:
   a charging resistor coupled between the primary voltage source and a charge storage capacitor in the secondary voltage source;
   a voltage divider having an input coupled to the junction of the charging resistor and the charge storage capacitor;
   a semiconductor switching device coupled between an output of the voltage divider and an input of the inverter whereby the semiconductor switching device remains non-conductive and the inverter inoperative until the charge storage capacitor becomes charged so that the inverter is protected from transients related to the surge of charge necessarily delivered to the charge storage capacitor subsequent to the energization of the ballast system.

2. A starting circuit as defined in claim 1 wherein the semiconductor switching device is a diac and wherein the inverter remains inoperative until the voltage at the output of the voltage divider reaches the breakover voltage of the diac.

3. A delayed starting circuit as defined in either claim 1 or claim 2 further comprising clamping means for maintaining the semiconductor switching device in a non-conductive state after the inverter has become operative.

4. A delayed starting circuit as defined in claim 3 wherein the clamping means comprises a diode having a first electrode coupled to the output of the inverter and a second electrode coupled to the semiconductor switching device and a capacitor coupled between the second electrode of the diode and a common potential.

5. A delayed starting circuit as defined in claim 4 wherein the first electrode is an anode and the second electrode is a cathode.

6. In an electronic ballast system having an inverter for driving a lamp filament, a primary voltage source and a secondary voltage source derived from the inverter output, a delayed starting circuit comprising:
   a charge storage capacitor coupled between the output of the secondary voltage source and a common potential;
   a first resistor coupled between the output of the primary voltage source and the charge storage capacitor;
   a second resistor having one end coupled to the junction of the first resistance and the charge storage capacitor;
   a third resistor coupled between the other end of the second resistor and the common potential;
   a semiconductor switching device coupled between the junction of the second and third resistors and an input of the inverter.

7. A delayed starting circuit as defined in claim 6 further comprising:
   a semiconductor clamping device coupled between the junction of the second and third resistors and an output of the inverter; and
   a clamping capacitor coupled between the junction of the second and third resistors and the common potential.

8. A delayed starting circuit as defined in either claim 6 or claim 7 wherein the semiconductor switching device is a diac and the semiconductor clamping device is a diode.

9. A delayed starting circuit as defined in claim 8 wherein the diode has an anode coupled to the junction of the second and third resistors and a cathode coupled to the output of the inverter.

10. A starting circuit for an electronic ballast system having an inverter for developing a lamp drive signal, said starting circuit comprising:
    a voltage divider having an input coupled through a resistance to a voltage supply and through a capacitance to a common potential; and
    a semiconductor switching device having a first electrode coupled to an output of the voltage divider and a second electrode coupled to an input of the inverter whereby immediately subsequent to the energization of the ballast circuit the voltage supply relatively rapidly assumes its nominal value so that the capacitance begins charging toward that nominal value and the voltage at the output of the voltage divider varies accordingly, eventually reaching the breakdown value of the semiconductor switching device so that the device becomes conductive thereby supplying a bias signal at the input of the inverter and consequently rendering the inverter operative.

11. A starting circuit as defined in claim 10 further comprising clamping means coupled to the output of the inverter and to the semiconductor switching device for rendering the semiconductor switching device non-conductive once the inverter has become operative.

12. A starting circuit as defined in claim 11 wherein the clamping means comprises a diode coupled between the output of the inverter and the output of the voltage divider and a capacitor coupled between the output of the voltage divider and the common potential.

13. In an electronic ballast system that includes an inverter for driving a lamp filament, a primary voltage source for supplying power to the inverter, a secondary voltage source derived from the inverter output and comprising a charge storage capacitor, the improvement comprising a delayed starting circuit for rendering the inverter inoperative until the charge storage capacitor has become substantially charged.

14. An improvement as defined in claim 13 wherein the delayed starting circuit comprises:

a charging resistor coupled between the output of the primary voltage source and the charge storage capacitor;

a voltage divider coupled across the charge storage capacitor;

a semiconductor switching device coupled between an output of the voltage divider and an input of the inverter, whereby the semiconductor switching device is rendered non-conductive and the inverter inoperative until the charge storage capacitor becomes substantially charged.

15. An improvement as defined in claim 14 wherein the delayed starting circuit further comprises clamping means coupled to the inverter output and the semiconductor switching device for maintaining the device non-conductive once the inverter has become operative.

16. An improvement as defined in claim 15 wherein the clamping means comprises a diode coupled between the output of the inverter and the output of the voltage divider and a capacitor coupled between the output of the voltage divider and a common potential.

* * * * *